May 17, 1949. A. G. FORSYTH 2,470,155
POWER PLANT ASSEMBLY
Filed May 16, 1942 5 Sheets-Sheet 1

Inventor
ARCHIBALD GRAHAM FORSYTH,
By Robert B. Larson
Attorney

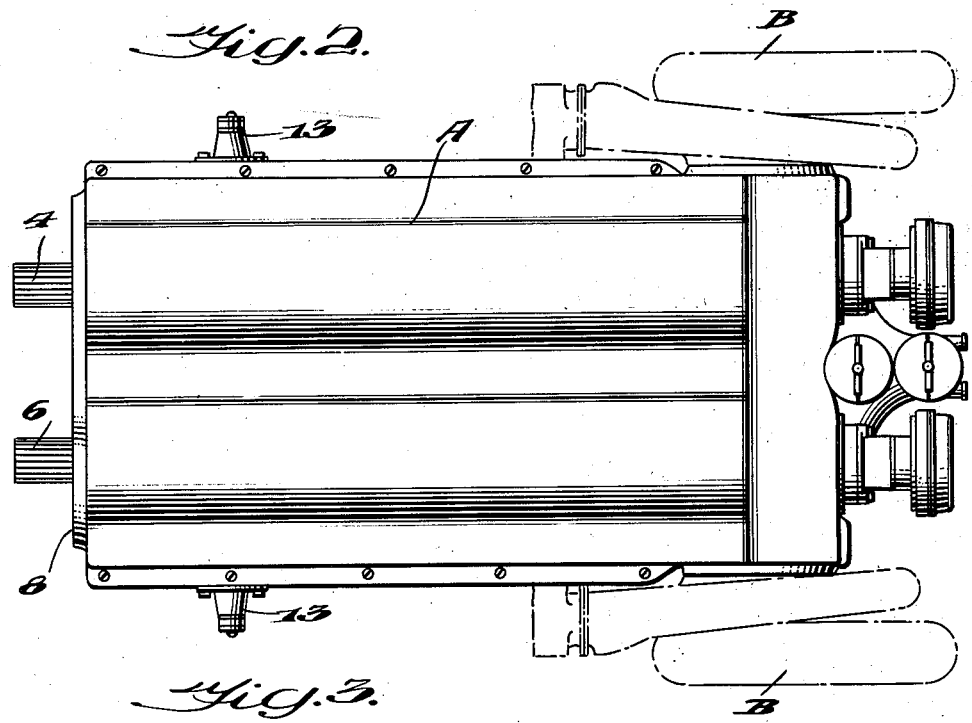
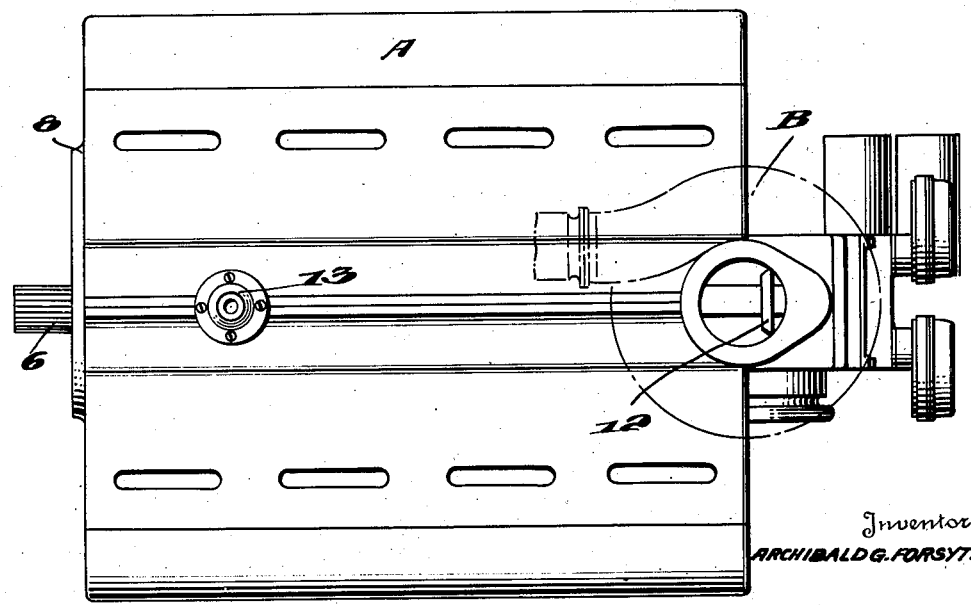

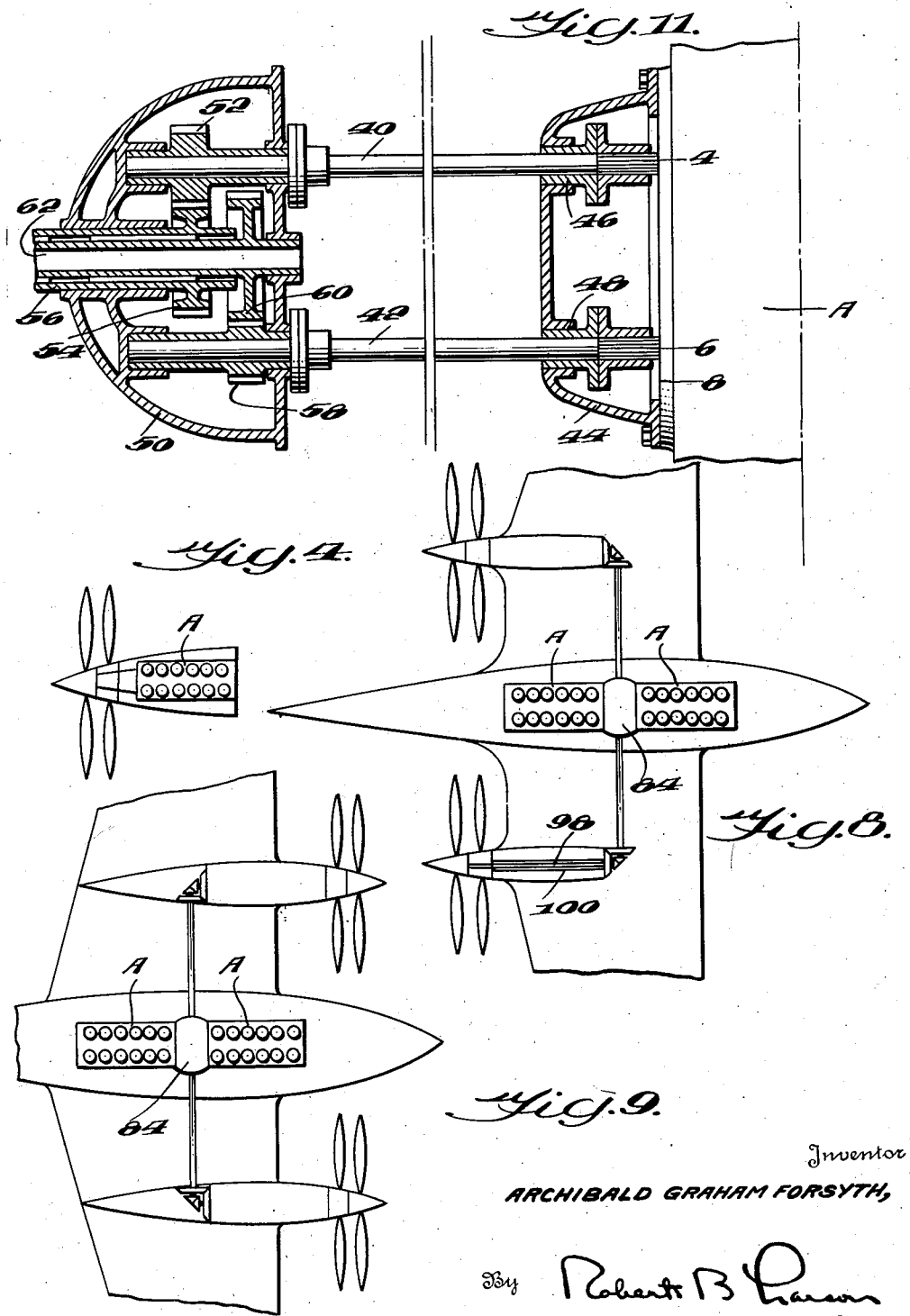

May 17, 1949.　　　A. G. FORSYTH　　　2,470,155
POWER PLANT ASSEMBLY
Filed May 16, 1942　　　5 Sheets-Sheet 4
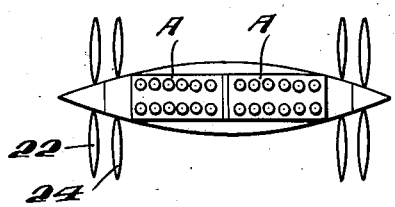
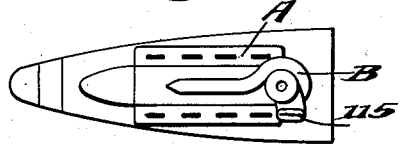
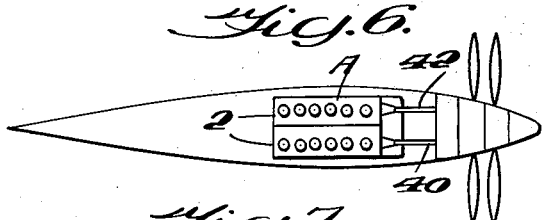
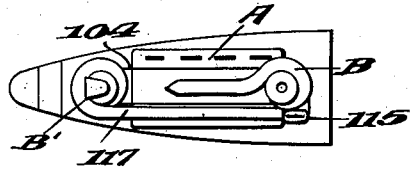
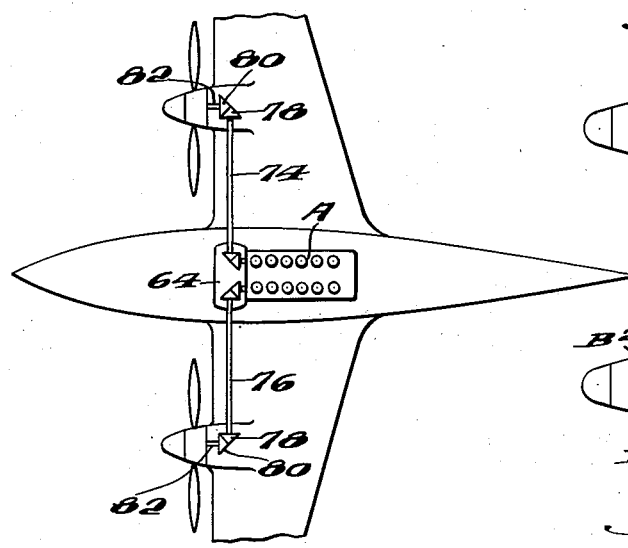
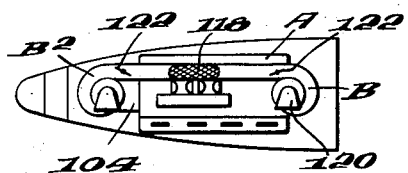
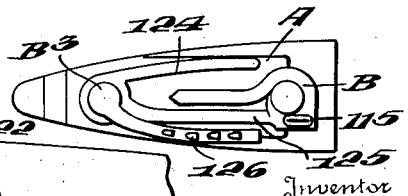
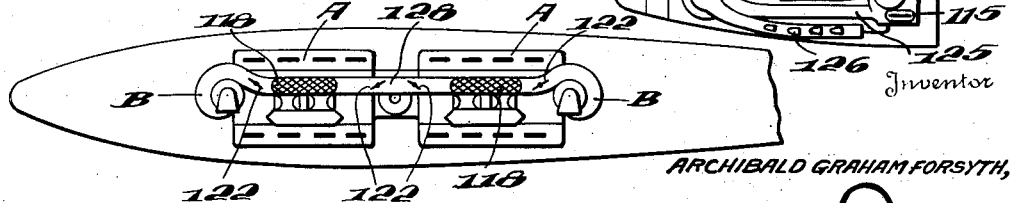
Inventor
ARCHIBALD GRAHAM FORSYTH,
By Robert B. Parson
Attorney May 17, 1949.　　　A. G. FORSYTH　　　2,470,155
POWER PLANT ASSEMBLY Filed May 16, 1942　　　　　　　　　5 Sheets-Sheet 5

Inventor
ARCHIBALD GRAHAM FORSYTH,

By Robert B. Pearson
Attorney

Patented May 17, 1949

2,470,155

UNITED STATES PATENT OFFICE 2,470,155

POWER PLANT ASSEMBLY

Archibald Graham Forsyth, Cheam, England, assignor to The Fairey Aviation Company Limited, Hayes, England Application May 16, 1942, Serial No. 443,231

2 Claims. (Cl. 244—60)

This invention relates to power plant units for aircraft and the like, and more particularly it relates to a power plant unit which, while adapted for mass production, is capable of ready use, with various gearing arrangements to drive the propellers, in practically any type of aircraft.

The principal object of the present invention is to provide such a power plant unit for aircraft and the like, and which may be used singly or in groups so arranged that the aircraft presents the minimum amount of head resistance.

Another object of the invention is to provide a power plant unit with which multi-engine reliability can be obtained for propelling various types of aircraft and the like.

A further object of the invention is the provision of a power plant unit which can be manufactured with mass production methods and which can be used singly or in groups in various combinations to drive contra rotating propellers.

The invention has for still another object the provision of a power plant unit which can be mass produced as such and which is so designed as to be later fitted with various types and arrangements of gear housings and superchargers.

These and other objects of the invention will be more apparent from the following description and claims when read in conjunction with the accompanying drawings, in which:

Figure 2 is a plan view of the unit.

Figure 3 is a side elevation of the unit.

Figures 4 to 9, inclusive, are diagrammatic plan views showing different types of aircraft arrangements in which the power plant units of the invention may be employed.

Figure 10:
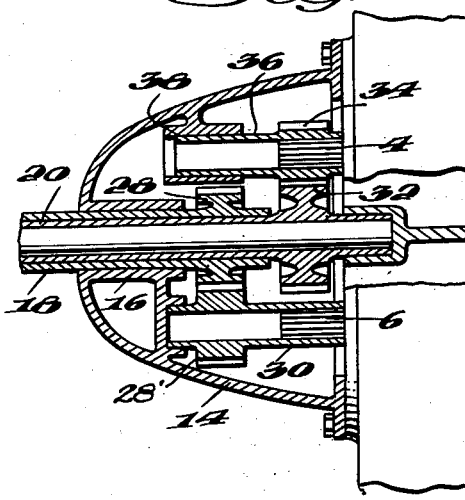

Figure 10 is a sectional view of a simple type of gearing such as is used, for example, with the arrangement of Figure 4 or at each end of the arrangement of Figure 5.

Figure 11 is a vertical sectional view of gearing which can be used with the arrangement of Figure 6.

Figure 12:
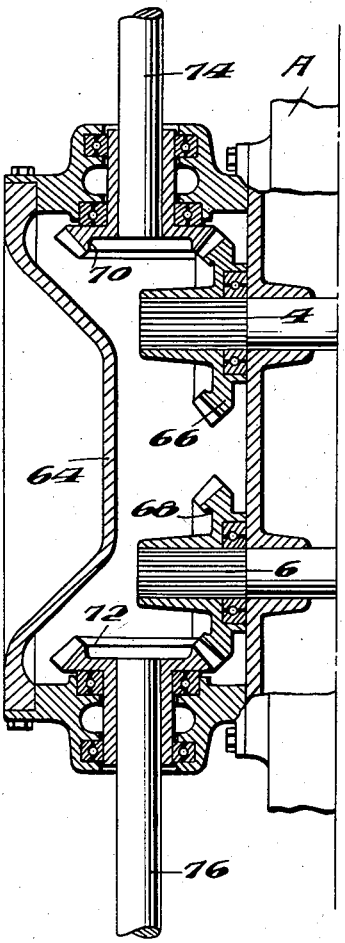

Figure 12 is a horizontal section of the gearing used in the arrangement of Figure 7.

Figure 13:
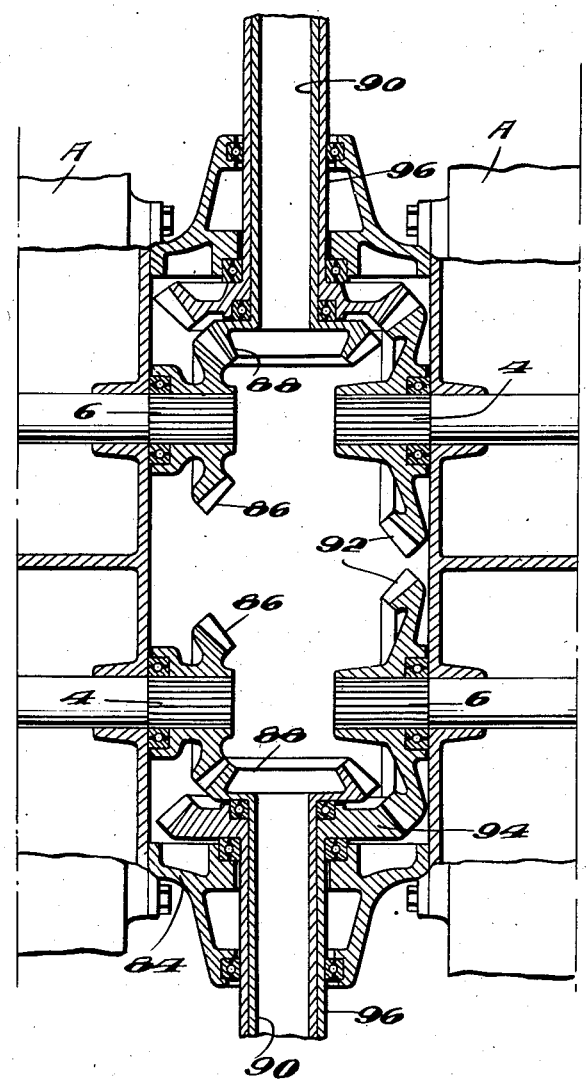

Figure 13 is a horizontal section of a gear arrangement adapted to be disposed between two power units and which is used in the arrangements shown in Figures 8 and 9.

Figures 14 to 19, inclusive, show diagrammatically various types of supercharger arrangements which can be effected through use of the power units constructed according to the invention.

Figure 20:
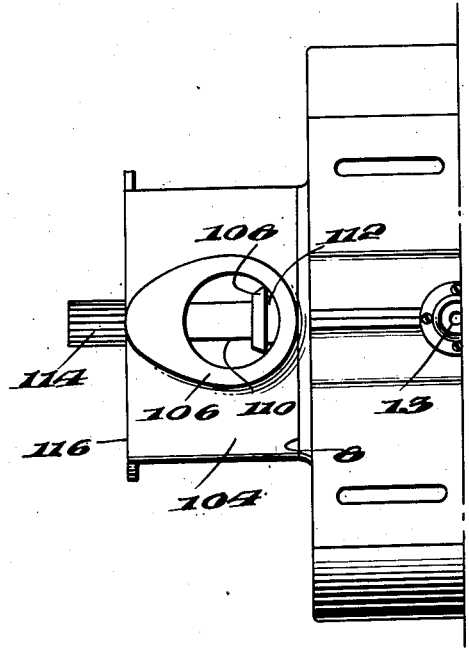

Figure 20 is a side elevation of an extension member applied to the front of the power unit to accomplish the addition of superchargers at the front as shown for example in the arrangements of Figures 14, 16, 17 and 18.

Figure 1:
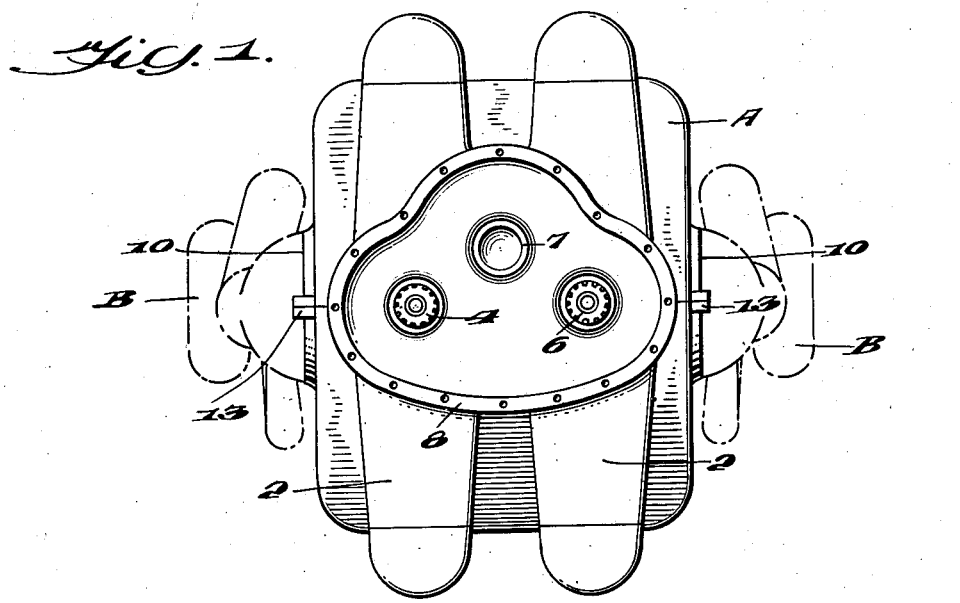
Figure 1 is a front view of a power plant unit constructed in accordance with the invention.

With specific reference to Figures 1, 2 and 3, it will be noted that these figures show various views of a main power plant unit A constructed in accordance with the invention and which is adapted to be produced by mass production methods. The units A will be described as consisting of two self-contained 12-cylinder internal combustion engines mounted on a common crank case, although obviously the motors of the unit may be provided with a different number of cylinders. As shown, each motor 2 is in the form of a flat 12-cylinder motor with the cylinders vertical. The complete unit A forms an H-type motor.

The two crank shafts run in opposite directions and their front ends 4 and 6, extending from the unit, are splined to receive various types of gearing, some of which will be described hereinafter.

Each power unit A is not provided with attached gearing for the crankshaft ends 4 and 6, but the front of the unit is provided with a facing 8 to which various types of gear-containing housings may be easily secured so that the gearing will be engaged and driven by the forwardly extending crankshaft ends 4 and 6.

Each motor 2 of a unit A is also provided with a side facing 10 at the rear side of the crankcase. These facings 10 are adapted to receive various forms of superchargers B, (such as shown for example in broken lines in Figures 1, 2, and 3) which may be mechanically driven, such as by the bevel gears 12 (Figure 3), mounted on the rear ends of the crank shafts.

Each power unit A may also be provided with trunnions 13 or other support means; and also with the usual auxiliaries, such as ignition means, fuel pumps, and the like.

It should be noted that each unit A is adapted for production with mass production methods and comprises a complete power plant with two motors, the front end of the unit terminating in a flanged facing with the splined crank shaft ends extending forwardly and available to take the reduction gearing or the like in housings which can be detachably secured to the facing. It should further be noted that each motor 2 of a unit A is provided with a side facing rearwardly disposed on the crankcase and to which facings superchargers may be detachably secured so as to be driven through gearing operatively connected with the rear end of the crankshafts.

Manifestly the manufacture of power units so comprised is greatly simplified, and it should also be equally clear that power units so produced are capable of use in any number of various propelling arrangements. Consequently such a unit comprises a standard unit capable of universal use and interchangeable in all types of aircraft.

Some of the multitude of various uses of this standard unit will now be described.

Figure 4, for example, shows diagrammatically how a single unit A may be disposed to drive contra rotating propellers.

Figure 5 shows how two such units A may be disposed on an aircraft, rear-to-rear, with the forward ends of the crank shafts driving contra-rotating propellers. To accomplish these arrangements, use may be made, for example, of a gear housing such as that indicated as 14 in Figure 10. Such a housing is adapted to be detachably secured to the facing 8 of the motor unit A by any suitable means.

The housing 14 contains a bearing 16 at its front end which receives the concentric shafts 18 and 20 for driving respectively the propellers 22 and 24 (Figure 4). Outer shaft 18 has a gear 28 mounted circumferentially thereof and which engages a gear 28' mounted on a shaft 30 the inner end of which is adapted to extend over the splined end 6 of the motor crankshaft when the housing 14 is secured to the facing 8 of the unit A.

The inner shaft 20 at its inner end is adapted to be received in the socket 7 in the unit A. Shaft 20 is provided with a circumferential gear 32 rigid therewith and adapted to engage with a gear 34 on a hollow shaft 36, one end of which is disposed over the splined end 4 of the crank shaft and the other end of which is mounted in a journal 38 supported from the wall of the housing 14.

It is manifest that upon operation of the unit A the shafts 18 and 20 will be rotated (through the gear described) so as to drive the propellers 22 and 24.

Housings such as 14, and the gearing therein contained, may also be quite simply produced by mass production methods, and obviously can be easily attached or detached to any standard unit A.

Figure 6 shows an arrangement employing a single unit A with extension shafts 40 and 42 running forwardly in spaced relation from the crankshaft ends 4 and 6. The gearing system for such an arrangement may be like that shown in Figure 11, in which the unit A is provided with a housing 44, adapted to be secured to the front facing 8 of the unit, and provided with journals 46, 48 for extension shafts 40 and 42. The inner ends of these shafts 40 and 42 are engaged by the splined crank shaft ends 4 and 6. The outer ends of the shafts 40 and 42 are journalled in a housing 50 secured to the aircraft.

Shaft 40 is provided with a gear 52 which engages gear 54 on hollow shaft 56 which drives one of the propellers. Shaft 42 has a gear 58 which engages a gear 60 rigid with an inner shaft 62 for driving the other propeller.

This arrangement shown in Figures 6 and 11 is adapted particularly for instances in which it is desired to dispose an aircraft cannon, or the like, between the shafts 40 and 42 centrally of the unit A, so as to shoot through the propeller hub, in this instance through hollow shaft 62.

Still another arrangement is shown in Figures 7 and 12. In this arrangement the power unit A, disposed centrally of the aircraft, is adapted through gearing to drive propellers mounted on the wings of the aircraft. As shown in Figure 12, the unit A has a housing 64 secured to its front facing 8. Bevel gears 66 and 68 secured to the splined ends 4 and 6 of the crank shaft ends engage, respectively, bevel gears 70 and 72 mounted on laterally extending shafts 74 and 76. At their outer ends (Figure 7) shafts 74 and 76 have bevel gears 78 which engage bevel gears 80 mounted on the propeller shafts 82.

Figures 8 and 9 illustrate further arrangements, each employing two units A with a common gear housing 84 therebetween, the gearing being such as to drive contra rotating sets of propellers. Figures 8 and 9 are generally similar except that one shows a pusher type arrangement and the other a tractor type. In each instance the gearing used may be like that illustrated in Figure 13.

In Figure 13 the two units A are disposed in spaced relation, front to front, and between them is secured a housing 84 containing gearing. In this arrangement the splined ends 4 and 6 of each unit A have bevelled gears mounted thereon. Splined ends 4 and 6 on the left hand unit, each have bevel gears 86, engaging respectively bevelled gears 88 secured on the ends of laterally extending shafts 90. Splined ends 4 and 6 of the right-hand unit A each have larger bevelled gears 92 engaging bevelled gears 94 mounted on the ends of laterally extending shafts 96. The shafts 96 are hollow and are disposed concentrically surrounding the shafts 90. At the outer ends of the concentric shafts 90 and 96, as indicated in Figures 8 and 9, similar bevel gear arrangements are disposed to drive concentric shafts 98, 100 disposed at right angles and extending to the propellers.

With this embodiment of the invention it is thus possible to drive two or more sets of propellers on each wing of the aircraft, with each propeller of a set being driven from a separate motor 2 of a power unit A.

In all the arrangements disclosed, it will be obvious that the invention provides multi-engine reliability. Thus even in the simpler forms such as that of Figure 4, should one motor 2 of the unit fail for any reason, the other motors of the unit will continue to drive its propeller. In those instances where several units are employed it is evident that even greater reliability is provided.

It has been previously indicated herein that each motor 2 is provided with a side facing 10 to which may be detachably secured a supercharger B. These superchargers carry gearing (not shown) which may be driven through gears connected with the rear ends of the motor crank shafts. With power units so constructed it is possible to obtain a number of different supercharging arrangements. These are diagrammatically shown in Figures 14 to 19, inclusive, which will now be described.

Figure 14 shows a power unit A with each motor thereof provided with a supercharger B. (Only one supercharger shows in the figure.) Each supercharger is detachably mounted on the unit at the side facings 10 (see Figures 1, 2 and 3) and may be mechanically driven by the rear end of the crank shaft through a bevel gear such as that indicated at 102 in Figure 3. With such an arrangement it is possible to have single or two speed stages.

The arrangement according to Figure 15 is partially similar to that of Figure 14, but in addition to the superchargers disposed at the sides of the motors of the power unit, one or more superchargers B' may be mounted at the front of the unit, so as to provide a two-speed system capable also of single speed, two stage.

In order to mount superchargers at the front of the unit it is necessary to add to the front facing 8 of the power unit A, as shown in Figure 20, an extension housing 104. The sides of this extension housing are provided with facings 106 on which the additional superchargers can be mounted. These additional superchargers, so mounted, may be driven mechanically from bevel gears 108 mounted on extension shafts 110, the inner end 112 of which engages over the splined crank shaft ends 4 and 6. The outer ends 114 of the extension shafts 110 are splined in the same manner as the crank shaft ends 4 and 6. The outer end of the extension 106 is constituted as a facing 116 adapted to receive various types of gear housings, such as those previously described herein.

In this arrangement each motor is provided with a throttle controlled carburetor 115 which is connected to the exhaust conduit 117 of the supercharger B' for that motor. Consequently, each motor of the unit may run supercharged by supercharger B, or supercharger B' may also be brought into operation. Any suitable arrangement may be employed for actuating the throttle valve in carburetor 115 when the change over is made.

The supercharger arrangement of Figure 16 also employs crank shaft driven superchargers mounted on the side rear facings 10 of each motor of the unit. In this instance the unit may be provided with a down draft carburetion arrangement having a screened opening 118 and the supercharger is controlled by a hydraulic clutch 120. A unit so constructed can run at normal speeds with normal aspiration provided through the screened opening 118, or the superchargers may be clutched in, when circumstances require.

The arrangement of Figure 17 is similar to that of Figure 16, but high altitude superchargers B² are added at the front of the unit on each motor. These are connected through conduits to the intake. Both in this arrangement and in that of Figure 16, suitable valves 122 are provided in the conduits leading from the superchargers, which valves may, according to known arrangements, be actuated simultaneously with the clutching and declutching of the superchargers and the closing and opening of throttle 118.

With the arrangement of Figure 17, it is therefore possible to run each motor normally aspirated, or to clutch in supercharger B, or if necessary also to clutch in supercharger B². In the latter case, the superchargers at both ends will supply air to the centrally disposed carburetors.

In the arrangement according to Figure 18 a two-speed mechanical system is provided (as in Figure 14) and, in addition thereto, exhaust turbo-superchargers B³ are employed. A shown in Figure 18 these superchargers B³ have a manifold 124 leading from the motor exhaust which drives the superchargers. The compressor delivers air through conduit 125 to carburetor 115, connected to supercharger B. Exhaust gases from superchargers B³ are discharged through pipe 126.

Finally, as seen in Figure 19, two units A are joined front to front and each unit is provided with superchargers B (as is the one unit in Figure 16). The down draft carburetors of all the motors are connected to receive the air from these superchargers, and are also connected by a manifold 128 so that when desired the supercharged B (at the right in Figure 19) can furnish air to the motor on the unit A (at the left of Figure 19). In place of some of the mechanically driven superchargers, or to supplement them, exhaust turbo-superchargers (not shown) may be employed as in the arrangement of Figure 18. The arrangement of Figure 19 can thus run normally aspirated, or with various ones or all of the superchargers to meet divers conditions demanded for flight.

It will be noted in this arrangement that several throttles 122 are disposed in the manifolds. These are suitably connected with the clutching devices (not shown) for the various superchargers so as to provide for various types of operation. For example, each unit A may operate alone and under conditions of normal aspiration. Each unit may operate alone supercharged by its attached superchargers. Both units may be operated simultaneously under conditions of normal aspiration. Both units may be operated simultaneously with one normally aspirated and the other supercharged. Finally, both units may be operated simultaneously while both are supercharged.

It should be manifest from the above that units constructed in accordance with the invention are adapted for use with superchargers which may be easily attached to make almost every possible type of supercharger system.

As indicated in the recited objects of the invention, and as will now be more apparent from the preceding descriptions, the invention makes it possible to provide airplanes with high power units so designed as to be capable of use in such manner as to reduce the head resistance of the craft to a minimum.

Moreover, power units as described may be mass produced as a standard unit which can, as shown, be used to drive any number of different propelling systems.

While a preferred embodiment of the power unit has been described and illustrated, it should be understood that changes in structure and arrangement may be made without departing from the basic concept of the invention.

I claim:

1. In an aircraft having a fuselage and a wing on each side thereof, a propulsion arrangement, comprising, a pair of propellers carried by each wing, each pair being mounted for rotation about a common axis, power means for driving each pair of propellers, said power means comprising two identical power units, each unit comprising two internal combustion engines having a common crankcase terminating at one end in a facing, the ends of the crankshafts of said engines extending through the faced end, said power units being disposed in longitudinal alignment with the faced ends toward but spaced from one another, a gear housing disposed between said units and detachably secured to said facings, gearing within said gear housing and operatively connected with the crankshaft ends of each of said units, two pairs of shafts each connected with said gearing and each pair extending laterally from said gear housing, and means connecting each of said pairs of shafts to each of said pairs of propellers.

2. In a aircraft having a fuselage and a wing on each side of the fuselage, a propulsion arrangement, comprising at least one pair of propellers carried by each wing, the propellers of each pair being mounted for rotation about a common axis, two power units disposed in said fuselage, each power unit comprising two internal combustion motors having a common crankcase with the crankshaft ends of said motors extending through one end of said crankcase, said crankcase end having a facing for detachably receiving a gear housing, said power units being disposed in longitudinal alignment with the faced ends adjacent but spaced from each other, a gear housing disposed between said units and secured to said facings, pairs of concentric shafts extending from said gear housing laterally to each pair of propellers with each shaft of a pair operatively connected to drive a propeller, and gearing within said gear housing connecting respectively the crankshaft ends of one power unit with one shaft of each concentric pair and the crankshaft ends of the other power unit with the other shaft of each concentric pair, whereby each motor drives a single propeller.

ARCHIBALD GRAHAM FORSYTH.

REFERENCES CITED

The following references are of record in the file of this patent:

UNITED STATES PATENTS

| Number | Name | Date |
| --- | --- | --- |
| 968,127 | Cloud | Aug. 23, 1910 |
| 1,394,870 | Thomas | Oct. 25, 1921 |
| 1,548,599 | Hall | Aug. 4, 1925 |
| 1,747,334 | Sundstedt | Feb. 18, 1930 |
| 1,971,998 | Valentine | Aug. 28, 1934 |
| 2,062,293 | Cashman | Dec. 1, 1936 |
| 2,085,483 | Trebucien | June 29, 1937 |
| 2,120,821 | Waseige | June 14, 1938 |
| 2,180,599 | Menasco | Nov. 21, 1939 |
| 2,201,893 | Gadoux et al. | May 21, 1940 |
| 2,219,980 | De Seversky | Oct. 29, 1940 |
| 2,225,109 | Goodman | Dec. 17, 1940 |
| 2,229,153 | Ware | Jan. 21, 1941 |
| 2,244,763 | Bugatti | June 10, 1941 |
| 2,284,473 | Menasco et al. | May 26, 1942 |
| 2,293,279 | Chilton et al. | Aug. 18, 1942 |
| 2,297,400 | Friedrich | Sept. 29, 1942 |
| 2,305,454 | Nallinger et al. | Dec. 15, 1942 |
| 2,310,220 | DeMichelis | Feb. 9, 1943 |
| 2,340,396 | McDonnell, Jr. | Feb. 1, 1944 |

FOREIGN PATENTS

| Number | Country | Date |
| --- | --- | --- |
| 345,546 | Italy | Jan. 8, 1937 |
| 338,133 | Italy | Mar. 28, 1936 |
| 502,554 | France | Feb. 24, 1920 |
| 538,046 | Great Britain | July 17, 1941 |
| 543,471 | France | June 3, 1922 |
| 781,386 | France | Feb. 25, 1935 |
| 807,747 | France | Jan. 20, 1937 |

OTHER REFERENCES

"Jane's All the World's Aircraft" for 1935, pages 18d and 19d.